United States Patent
Rothman et al.

(10) Patent No.: US 7,593,884 B2
(45) Date of Patent: Sep. 22, 2009

(54) MULTI-CURRENCY MARKETPLACE

(75) Inventors: Dan Rothman, New York, NY (US); Mark Higgins, New York, NY (US)

(73) Assignee: Goldman Sachs & Co., New York, NY (US)

( * ) Notice: Subject to any disclaimer, the term of this patent is extended or adjusted under 35 U.S.C. 154(b) by 908 days.

(21) Appl. No.: 10/120,195

(22) Filed: Apr. 10, 2002

(65) Prior Publication Data

US 2002/0152154 A1 Oct. 17, 2002

Related U.S. Application Data

(60) Provisional application No. 60/282,786, filed on Apr. 10, 2001.

(51) Int. Cl.
*G06Q 40/00* (2006.01)
(52) U.S. Cl. .............. 705/37; 705/26; 705/80
(58) Field of Classification Search ............ 705/26, 705/37, 80
See application file for complete search history.

(56) References Cited

U.S. PATENT DOCUMENTS

| | | | |
|---|---|---|---|
| 5,787,402 A | 7/1998 | Potter et al. | |
| 6,247,000 B1 | 6/2001 | Hawkins et al. | |
| 6,269,345 B1 | 7/2001 | Riboud | |
| 6,347,307 B1 | 2/2002 | Sandhu et al. | |
| 6,415,270 B1 * | 7/2002 | Rackson et al. | 705/36 R |
| 6,892,184 B1 | 5/2005 | Komem et al. | |
| 7,010,504 B2 * | 3/2006 | Ishikawa et al. | 705/26 |
| 2002/0161692 A1 | 10/2002 | Loh et al. | |

FOREIGN PATENT DOCUMENTS

WO WO 00/58862 * 10/2000

OTHER PUBLICATIONS

Multinational Business Finance: Eighth Edition. By David K. Eiteman, Arthur I. Stonehill, Michael H. Moffett. Addison-Wesley Publishing Company, Inc. (1998). pp. 82-107, pp. 825.*

Citibank (www.citibank.com, Retrieved from Internet Archive Wayback Machine<www.archive.org>, date range: Dec. 26, 1996-Apr. 5, 2001.*

* cited by examiner

*Primary Examiner*—Jagdish N Patel
*Assistant Examiner*—Sara Chandler
(74) *Attorney, Agent, or Firm*—Chadbourne & Parke LLP; Walter G. Hanchuk

(57) ABSTRACT

A computerized method and system buying and selling in a marketplace denominated in multiple currencies. A best bid or best offer can be determined according to pecuniary advantage based upon a selected currency. An amount required to become a best bid or best offer within a set of defined currencies is also included. Some embodiments include a network of computers permitting access to a multi-currency marketplace. Prices in the multi-currency marketplace can be ranked according to a particular currency selected by a market participant.

17 Claims, 9 Drawing Sheets

```
┌─────────────────────────────────────────────────────────────┐
│ 510                                                         │
│         Determine a set of N currencies C(1), C(2), ... , C(N) │
└─────────────────────────────────────────────────────────────┘
                              │
┌─────────────────────────────────────────────────────────────┐
│ 511                                                         │
│              Determine a foreign exchange rate              │
│         between currencies i and j as S( C(i), C(j) )       │
└─────────────────────────────────────────────────────────────┘
                              │
┌─────────────────────────────────────────────────────────────┐
│ 512                                                         │
│              Receive a Number of Bid Prices (B)             │
└─────────────────────────────────────────────────────────────┘
                              │
┌─────────────────────────────────────────────────────────────┐
│ 513                                                         │
│         Determine Bid Prices PB(1), PB(2), ..., PB(B)       │
└─────────────────────────────────────────────────────────────┘
                              │
┌─────────────────────────────────────────────────────────────┐
│ 514                                                         │
│      Determine Currencies of the Bid Prices CB(1), CB(2), ... , CB(B) │
└─────────────────────────────────────────────────────────────┘
                              │
┌─────────────────────────────────────────────────────────────┐
│ 515                                                         │
│    Calculate a quantity  PB(i) * S( C(m), CB(i) ) * [ 1 - F( C(m), CB(i) ) ] │
│                     for each Bid Price, PB(i)               │
└─────────────────────────────────────────────────────────────┘
                              │
┌─────────────────────────────────────────────────────────────┐
│ 516                                                         │
│                  Sort a List of Each Quantity               │
└─────────────────────────────────────────────────────────────┘
                              │
┌─────────────────────────────────────────────────────────────┐
│ 517                                                         │
│            Determine a Largest Value for the Quantities     │
└─────────────────────────────────────────────────────────────┘
```

Fig. 5

```
┌─────────────────────────────────────────────────────────────────────┐
│ 610                                                                 │
│         Determine a set of N currencies C(1), C(2), ... , C(N)      │
└─────────────────────────────────────────────────────────────────────┘
                                    │
┌─────────────────────────────────────────────────────────────────────┐
│ 611              Determine a foreign exchange rate                  │
│              between currencies i and j as S( C(i), C(j) )          │
└─────────────────────────────────────────────────────────────────────┘
                                    │
┌─────────────────────────────────────────────────────────────────────┐
│ 612                                                                 │
│                   Receive a Number of Offer Prices (A)              │
└─────────────────────────────────────────────────────────────────────┘
                                    │
┌─────────────────────────────────────────────────────────────────────┐
│ 613                                                                 │
│            Determine Offer Prices PA(1), PA(2), ..., PA(A)          │
└─────────────────────────────────────────────────────────────────────┘
                                    │
┌─────────────────────────────────────────────────────────────────────┐
│ 614                                                                 │
│       Determine Currencies of the Offer Prices CA(1), CA(2), ... , CA(A) │
└─────────────────────────────────────────────────────────────────────┘
                                    │
┌─────────────────────────────────────────────────────────────────────┐
│ 615                                                                 │
│   Calculate a quantity  PA(i) * S( C(m), CA(i) ) * [ 1 - F( C(m), CA(i) ) ] │
│                       for each Bid Price, PB(i)                     │
└─────────────────────────────────────────────────────────────────────┘
                                    │
┌─────────────────────────────────────────────────────────────────────┐
│ 616                                                                 │
│                     Sort a List of Each Quantity                    │
└─────────────────────────────────────────────────────────────────────┘
                                    │
┌─────────────────────────────────────────────────────────────────────┐
│ 617                                                                 │
│            Determine a Smallest Value for the Quantities            │
└─────────────────────────────────────────────────────────────────────┘
```

Fig. 6

MULTI-CURRENCY MARKETPLACE

CROSS REFERENCE TO RELATED APPLICATIONS

This application claims priority to the Provisional Application entitled "Making Prices in a Multi-Currency Marketplace" filed Apr. 10, 2001, and bearing the Ser. No. 60/282,786.

BACKGROUND

This invention relates generally to a method and system for facilitating buying and selling denominated in multiple currencies. In particular, the present invention relates to a computerized marketplace and method for facilitating the determination of a best bid or best offer in a multi-currency setting.

It is known to have a single-currency marketplace to buy or sell a given asset. One or more participants post prices at which the participants are willing to buy the asset (bid) and other participants post a price at which they are willing to sell the asset (an offer, or "ask").

At a given point in time, there is a best bid, defined as the highest price posted to buy. There is also a best offer, which is the lowest price posted to sell.

If the best bid and the best offer overlap, such that the best bid is equal to or higher than the best offer, a trade can happen between two participants associated with the overlapping prices posted.

Also, if an interested buyer comes into the market, the interested buyer can immediately look at offer prices and decide to buy from a participant with a best offer. Similarly, an interested seller can sell to a participant with a best bid. Immediate sales are accomplished with a "market order", which signifies that the buyer or seller does not explicitly post a bid or an offer themselves, they instead respond to the market and trade immediately at a best price available.

If a new participant enters the market and wants to become the best bid, the new participant can look at existing bids and make a bid slightly above a current best bid.

A buying and selling process becomes more complicated when participants in a market are not all using a same currency. Complication can occur due to participants having to pay a fee, such as a foreign exchange (FX) fee, when exchanging currency. Therefore, a trader, denominated in a currency A, may seek to buy an asset. Two offers may be available for the asset in the market: one offer is to sell the asset for 1 unit of currency A, and another offer to sell the asset for 1 unit of currency B. A mid-market currency exchange rate may be 1 A for 1 B, but there may also be a 1% fee associated with converting the currencies involved.

Therefore, the participant could buy the asset for 1A, or he could convert some A into B and buy the asset for 1B. As a result of the FX fee, he would have to spend 1.01A to obtain the 1B. This means that, for him, the offer of 1A is the best offer, even though the two offers are equivalent at mid-market exchange rates. A different participant, denominated in a currency B, may ascertain the same two offers, and yet because the different participant would have to pay a fee to exchange her B into A, may conclude that the B-denominated offer is the best offer.

However, determining a best price from prices presented in multiple currencies can leave room for mistakes, particularly if buying and selling is being transacted at a frenetic pace often present on an online exchange.

Similarly, a participant who wants to become a best bid have a complicated task. For someone viewing the market in a given currency, bids are ordered in given way, and a participant can change a bid to ensure that they show as the best bid. However, once they show their price, it may not be the best bid for another participant viewing the market denominated in a different currency, since the ordering of the bids can change based upon exchange fees.

Therefore what is needed is a marketplace that presents bids and offers according to a particular currency selected by each participant.

SUMMARY

Accordingly, the present invention provides a marketplace and methods for providing a bid or offer according to a currency selected by a participant. Embodiments can include presentation of a best bid and/or best offer ranked among multiple bids and offers according to all expenses involved in exchanging currency among participants involved.

A bid can be selected from a plurality of bids according to a received set of bid prices. A currency can be associated with each bid price and a currency can be selected by a participant such that a bid can be selected that represents maximum pecuniary value from the perspective of the currency selected by the participant. If desired, all bids can be ranked according to pecuniary value. An indication of a selected bid can be transmitted to a participant.

Similarly, an offer can be selected from a plurality of offers by receiving a set of offer prices, determining a currency associated with each offer price, receiving an indication of a currency selected by a participant and selecting an offer representing maximum pecuniary value from the perspective of the currency selected by the participant. Offers can also be ranked according to pecuniary value.

In another aspect of the present invention, a bid can be selected that represents a maximum pecuniary value from the perspective of a currency selected by a participant. The bid can be selected by determining a set of currencies and an exchange rate between the currency selected by the participant and each other currency. A value of each bid price and a currency the bid is denominated in can also be received such that a quantity for each bid can be calculated. The quantity can be based upon the bid price and the exchange rate between the selected currency and the currency of each bid. A bid associated with a greatest quantity calculated can be selected or other bid according to the quantity calculated.

An offer can be selected from amongst a plurality of offers utilizing a similar technique and selecting an offer associated with a smallest quantity calculated.

Other embodiments of the present invention can include a computerized system, executable software, or a data signal implementing the inventive methods of the present invention.

DESCRIPTION OF THE DRAWINGS

FIG. 5 illustrates a flow of exemplary steps including an algorithm that can be executed by a user while implementing the present invention to determine a best bid.

FIG. 6 illustrates a flow of exemplary steps including an algorithm that can be executed by a user while implementing the present invention to determine a best offer.

DETAILED DESCRIPTION

The present invention provides systems and methods for providing a marketplace that can present a relative ranking of a bid or offer according to a currency selected by a participant. Typically participants will access the marketplace via an electronic communications network. Assets for sale, and offers to purchase assets, are presented with an indication of how favorable a bid or offer may be according to a particular currency selected. A currency selected can be any currency conducive to the purposes of a market participant. Embodiments can include presentation of a best bid and/or best offer ranked among multiple bids and offers according to all expenses involved in exchanging currency among participants involved. A best offer can be a function of who is looking at the market and for what purpose. Similarly, a best bid can also be a function of who is looking at a market and for what purpose.

Figure 1:
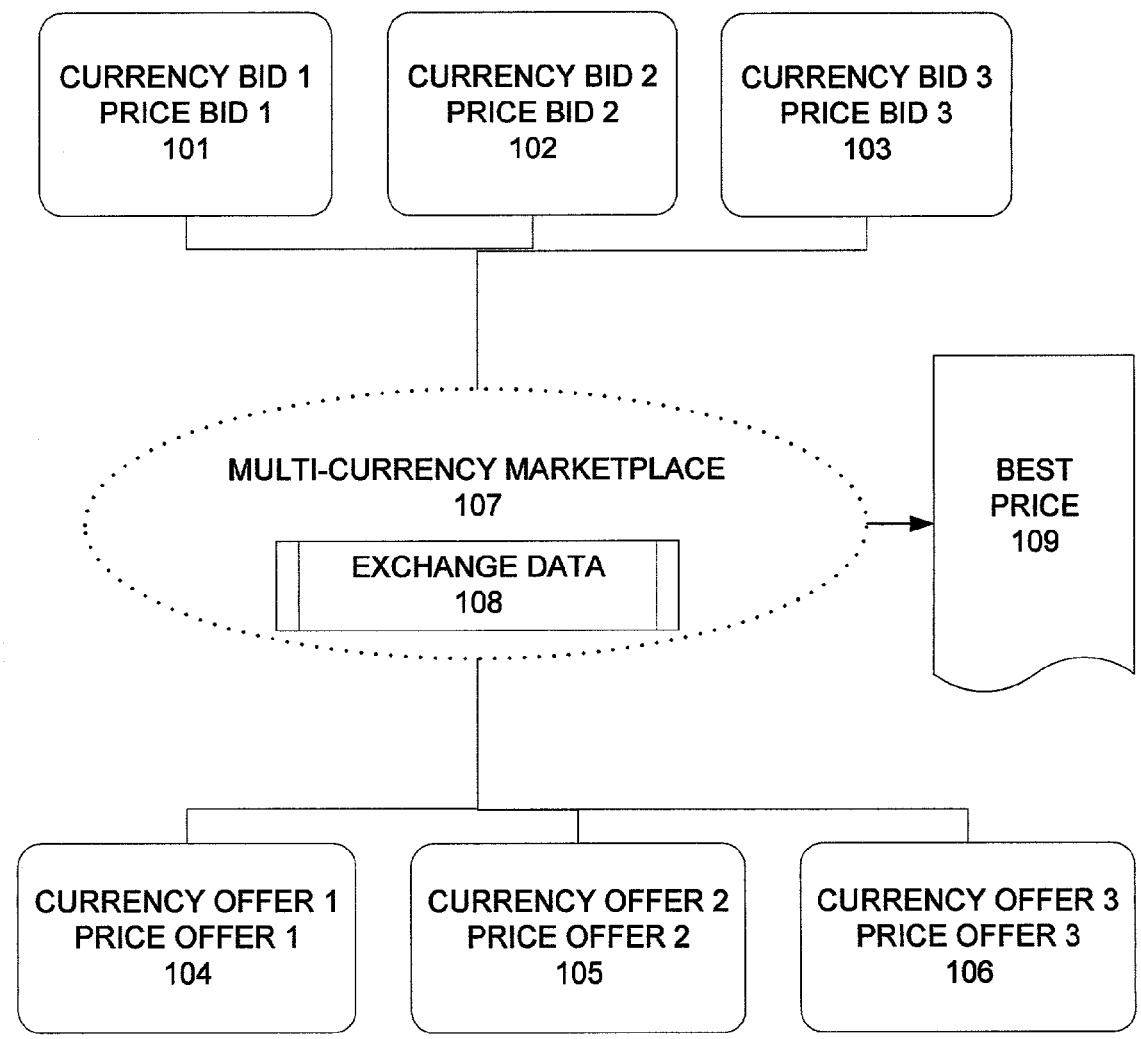
FIG. 1 illustrates a block diagram that can embody the present invention.

Referring now to FIG. 1, a block diagram representing the present invention is illustrated. The following discussion will generally discuss a multi-currency marketplace, however the present invention also includes business to business (B2B) exchanges, business to customer exchanges (B2C), auctions, and any other environment in which one or more buyers and one or more sellers are making prices to transact in two or more currencies. Therefore the present invention includes one buyer and multiple sellers, multiple buyers and one seller, and multiple buyers and multiple sellers. Multiple bids 101-103 for an asset to be sold can be received by a multi-currency marketplace (MCM) 107. Each bid 101-103 will have a bid price and a currency that the bid price is denominated in.

The MCM 107 can also receive multiple offers 104-106, wherein each offer 104-106 has an offer price and an offer currency. An MCM 107 can receive all relevant data and execute a computer program or other algorithm to determine a best price 109 for a bid or an offer in a market wherein "best" is determined according to a bid that represents a maximum pecuniary value from the perspective of a particular currency (similarly for a "Best" offer). A computer can execute a program or otherwise implement an algorithm for determining what is a best bid and/or a best offer in a market according to a participant viewing the market, wherein the participant is denominated in, or otherwise selected, a particular currency.

Bids 101-103 and offers 104-106 can also be ordered as a function of a selected currency, such as the currency denomination selected by a participant viewing the market. Order may therefore vary according to the currency selected as different currency may be exchanged in different ways and have different fees associated with an exchange.

Figure 3:
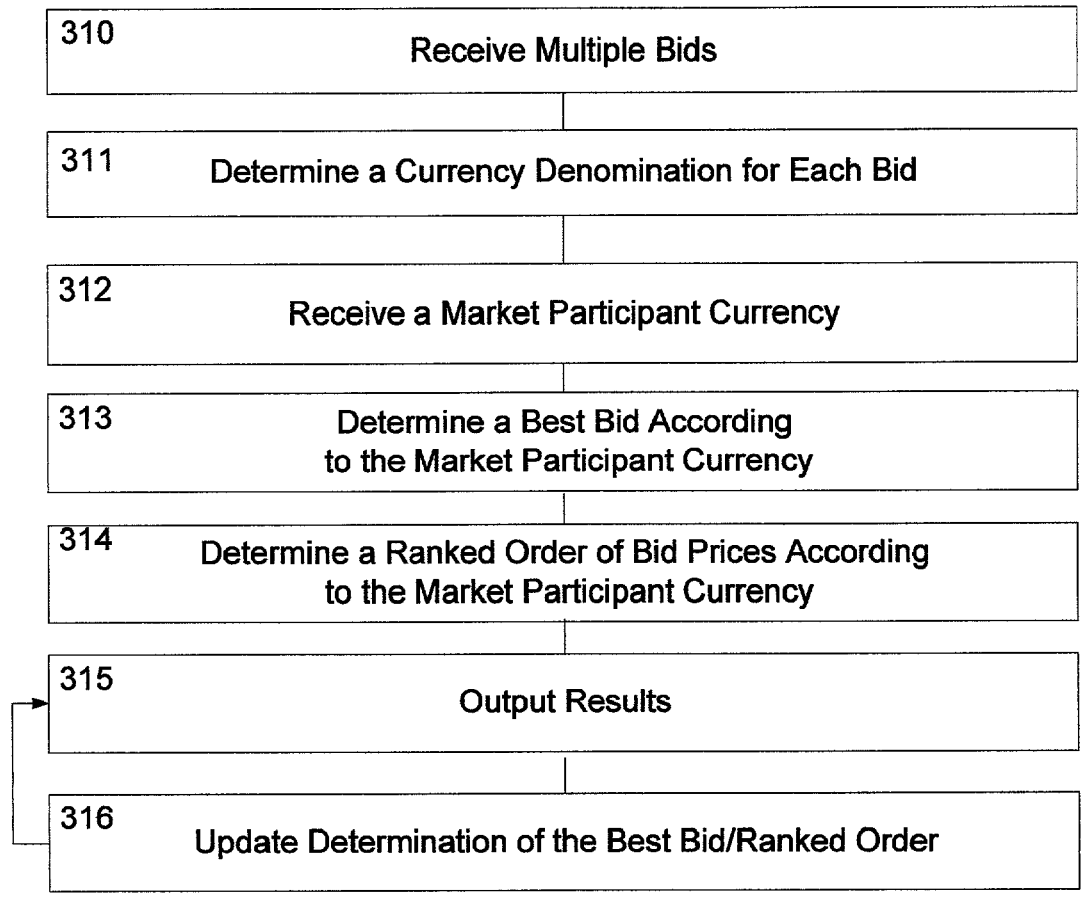
FIG. 3 illustrates a flow of exemplary steps that can be executed while implementing the present invention to determine a best bid.

Referring now to FIG. 3, in some embodiments directed towards bids, a MCM 107 can receive multiple bids 310 and determine a denomination for each bid 311. The MCM 107 can also receive a currency selected by a market participant 312. In some embodiments, the MCM can access currency exchange data 108 and determine a best bid from the perspective of the participant selected currency 313. Other embodiments, allow the MCM 107 to determine a ranked order of bid prices according to the market participant currency 314. The results can be output 315, such as to a computer display, a hardcopy, a computer signal, a computer readable medium or other mechanism. The determination of a best bid or ranked order can be updated according to market data or other information received 316 and output 315.

Figure 4:
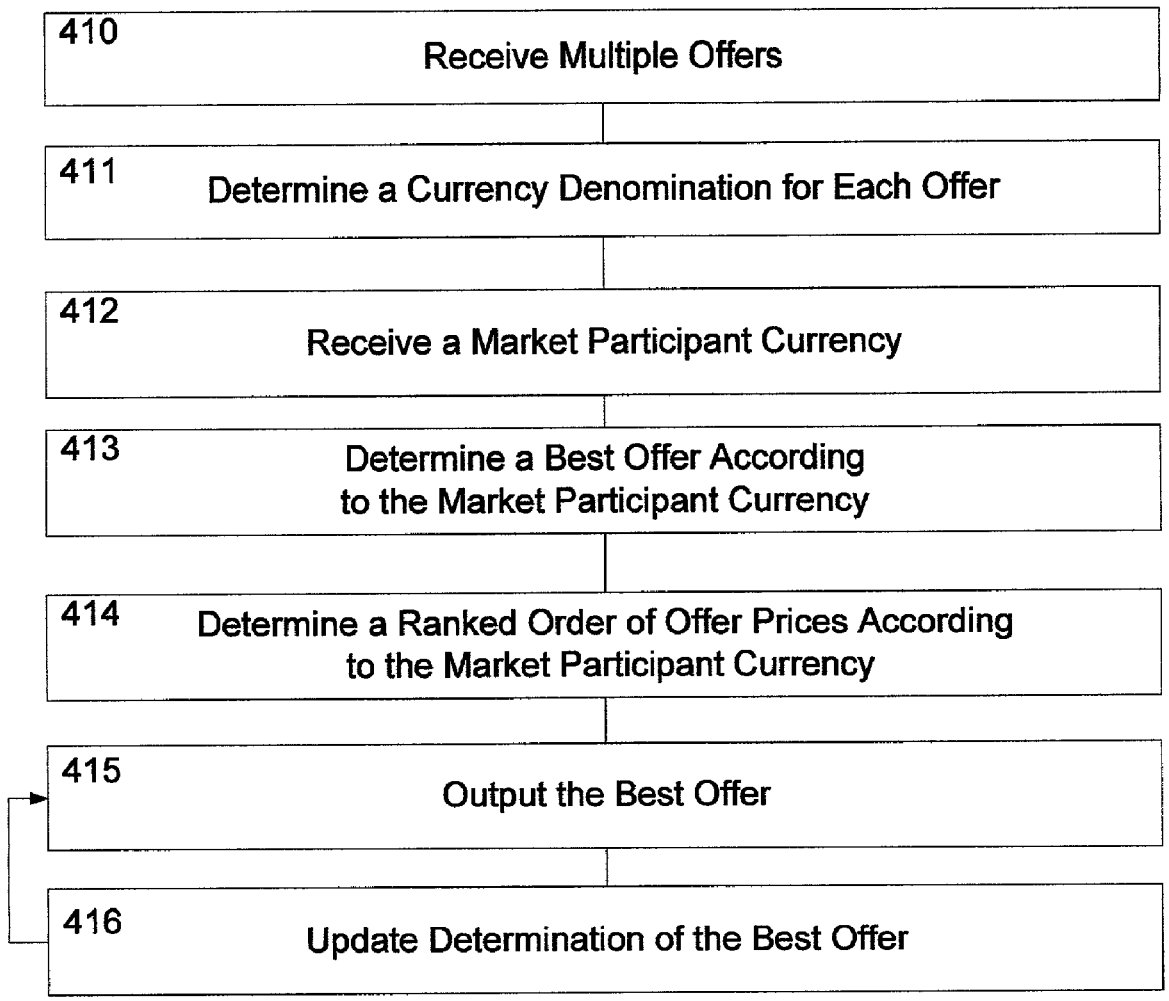
FIG. 4 illustrates a flow of exemplary steps that can be executed by a user while implementing the present invention to determine a best offer.

Similar to a best bid, the present invention can determine a best offer, as depicted in exemplary steps in FIG. 4. A MCM 107 can receive multiple offers 410 and determine a denomination for each offer 411. The MCM 107 can also receive a currency selected by a market participant 412. In some embodiments, the MCM can access currency exchange data 108 and determine a best offer from the perspective of the participant selected currency 413. Other embodiments, allow the MCM 107 to determine a ranked order of offer prices according to the market participant currency 414. The results can be output 415, such as to a computer display, a hardcopy, a computer signal, a computer readable medium or other mechanism. The determination of a best offer or ranked order can be updated according to market data or other information received 416 and output 415.

Referring now to FIG. 5, a computer program or other algorithm can be utilized to determine what price a participant must make to ensure that a bid or offer is the best bid or offer for a given subset of viewers denominated in different currencies.

Embodiments can include a set of N currencies $C(1)$, $C(2), \ldots, C(N)$ 510. Wherein the foreign exchange rate between currencies i and j as $S(C(i), C(j))$, which represents the midmarket foreign exchange spot rate for exchanging $C(j)$ into $C(i)$ (the value of one unit of $C(j)$ in units of $C(i)$) 511. A fee associated with exchanging i and j can be equal to $F(C(i), C(j))$, and can be paid whether $C(i)$ is exchanged into $C(j)$, or whether $C(j)$ is exchanged into $C(i)$. In some embodiments the fee can be incorporated in the exchange rate as a bid offer spread. An $F(C(i), C(i))$ can be zero such that a fee corresponding to exchanging a currency for itself costs nothing. Embodiments can also include a fee that incorporates other costs such as a shipping fee or other expense.

A set of posted bid prices in the market which are in an assortment of the currencies, can be received 512. A quantity, or number of bids 101-103 can be B, such that the bid prices can be $PB(1), PB(2), \ldots, PB(B)$ 513. The currencies of the bid prices can be $CB(1), CB(2), \ldots, CB(B)$ 514.

There can also be a set of posted offer prices in the market in an assortment of currencies; the number of posted offer prices can be represented by A. The offer prices can therefore be $PA(1), PA(2), \ldots, PA(A)$, and the currencies of the offer prices can be $CA(1), CA(2), \ldots, CA(A)$.

The ordering of the bid prices and ask prices from the perspective of someone viewing the market who is denominated in currency $C(m)$ can be determined utilizing a computer executed program and presented to the participant to facilitate decisions made by the participant on which actions to make in the market.

Embodiments include a computer implementing an algorithm for determining ordered bid prices and a best bid price. For example, for each bid price $PB(i)$, a quantity can be calculated as $PB(i)*S(C(m), CB(i))*[1-F(C(m), CB(i))]$. A price can be reduced below a midmarket rate because a participant who sells to the bid price has to convert the currency $CB(i)$ back to another currency $C(m)$ 515.

The list can be sorted using a sorting algorithm, such as a quick sort or bubble sort, or other known sorting algorithm

516. A largest value can be determined from a resultant list, wherein generally the largest value will be considered the best bid price 517.

Referring now to FIG. 6, a similar process can be utilized to determine a best offer. Best offer embodiments can also include a set of N currencies C(1), C(2), . . . , C(N) 610. Wherein the foreign exchange rate between currencies i and j as S(C(i), C(j)), which represents the midmarket foreign exchange spot rate for exchanging C(j) into C(i) (the value of one unit of C(j) in units of C(i)) 611. A fee associated with exchanging i and j can be equal to F(C(i), C(j)), and can be paid whether C(i) is exchanged into C(j), or whether C(j) is exchanged into C(i). In some embodiments the fee can be incorporated in the exchange rate as a bid offer spread. An F(C(i), C(i)) can be zero such that a fee corresponding to exchanging a currency for itself costs nothing.

A set of posted offer prices in the market which are in an assortment of the currencies, can be received. There can also be a set of posted offer prices in the market in an assortment of currencies; a quantity, or number of posted offer prices can be represented by A 612. The offer prices can therefore be PA(1), PA(2), . . . , PA(A), and the currencies of the offer prices can be CA(1), CA(2), . . . , CA(A) 613.

The ordering of the bid prices and ask prices from the perspective of someone viewing the market who is denominated in currency C(m) 614 can be determined utilizing a computer executed program and presented to the participant to facilitate decisions made by the participant on which actions to make in the market.

An example of an algorithm that can be implemented in a computer function for determining ordered offer prices and best offer price can include 615: for each offer price PA(i), a quantity can be calculated as PA(i)*S(C(m), CA(i))*[1+F(C(m), CA(i))]. The price can increase above a mid-market rate because a participant who buys at the offer price has to convert the participant's currency C(m) into the offered price's currency CA(i) before buying.

A resulting list can be sorted 616 using a sorting algorithm, such as, for example, a quicksort or bubble sort, or other known sorting algorithm. A smallest value can be selected from the list 617, generally, the smallest value will be considered the best offer price 109.

A bid 101-103 or offer that is in the same currency as the currency the participant viewing the market has selected will have a pricing advantage since there is no foreign exchange fee associated with those bids 101-103 and offers. This tendency can be different for participants selecting different currencies, therefore a best bid/offer price 109 may be different for different participants, or for a same participant as the participant selects different currencies. A currency with less fees can be advantaged over a currency with greater fees.

Figure 7:
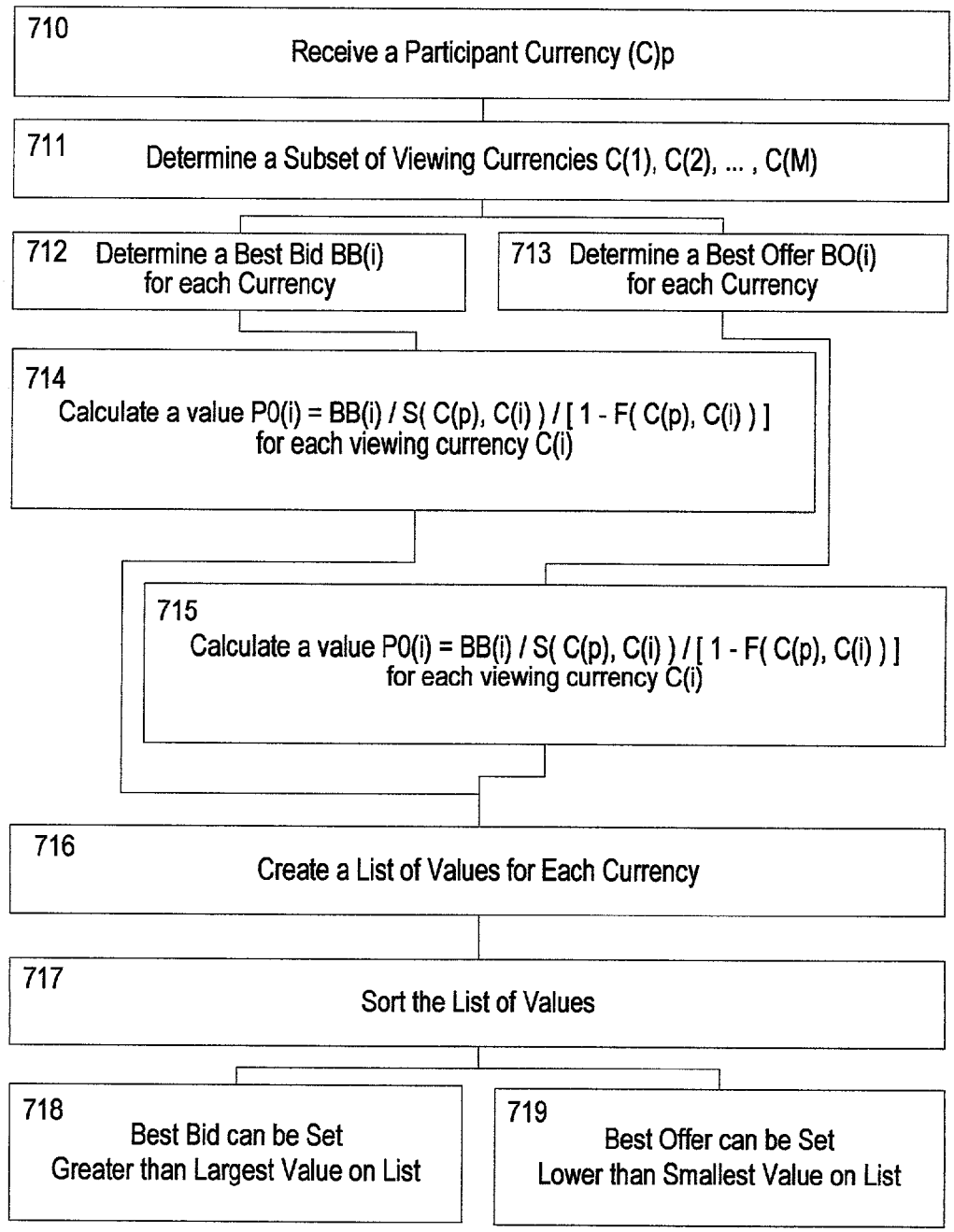
FIG. 7 illustrates a flow of exemplary steps that can be executed by a user while implementing the present invention for a subset of currencies.

Referring now to FIG. 7, in another aspect of the present invention, an algorithm that can be implemented in a computer function for determining what price a participant must make to ensure that their bid or offer is the best bid or offer for a given subset of participants denominated in different currencies.

For example, a best bid or offer can be a function of a participant viewing available prices and a currency that a participant selects. The currency a participant viewer selects may not be known to the participant bid poster. One method of addressing this situation includes determining a price to make the bid poster's bid a best bid for a given subset of viewers.

Therefore, for example, an MCM 107 can receive an indication of a participant selected currency 710 a participant denominated in currency C(p), can make a new best bid/best offer and beat a best bid/offer in a subset of viewing currencies C(1), C(2), . . . , C(M) determined 711. For each viewing currency C(i) in the subset, a computer function can compute a best bid BB(i) as described above 712 or a best offer BO(i) 713 for each currency. In addition values P0(i)=BB(i)/S(C(p), C(i))/[1−F(C(p), C(i))] can be calculated for each viewing currency C(i) 714. A structured list of best prices 109, one for each viewing currency can be compiled with calculated results 716 and sorted 717 using a sorting algorithm such as a quicksort or bubble sort. A largest value from this list of best bids can indicate a best bid. To show a best bid price 109, the participant's bid price 101-103 can be larger than the largest value from this list of best bid prices 718.

For example, if a participant denominated in U.S. dollars wants to place a best bid against a subset of bidders which includes bidders denominated in Canadian dollars, Japanese Yen and Euros. The MCM 107 can first determine what bid is required for each of the subset currencies. The MCM 107 may determine, for example, that the Canadian subset requires a bid of $1002.00 U.S. dollars, the Euros a bid of $1008.00 U.S. dollars and the Yen a bid of $1003.00 U.S. dollars. A list can include all of these prices, and a sort can indicate that a best bid overall would need to be $1008.00.

Similarly, for determining what price is required to make a best offer, a best offer, BA(i) can be computed as described above, for each viewing currency C(i) in a subset. Values P0(i)=BA(i)/S(C(p),C(i))/[1+F(C(p),C(i))] can be calculated for each viewing currency C(i) 715.

A resulting list of values 716 can be sorted using a sorting algorithm 717, such as, for example, a quicksort or bubble sort, or other known sorting algorithm. A smallest value can be selected from the list. Generally, to show the best offer, a participant's price must be smaller than the smallest value to make a best offer 719.

Embodiments can also include a threshold delta for fees that excludes active consideration of a currency if the currency exceeds the threshold for fees, in which case a participant seeking to place a best bid may place the bid higher than the best offer in some other currency. This can occur when some bids are denominated in an illiquid currency that has large foreign exchange fees. If a currency includes some bids that exceed a threshold for fees, some portion of the market may be "cut off". Participants denominated in the illiquid currency may only be able to trade with themselves because of the large fees associated with transferring foreign exchange to trade with participants denominated in other currencies. If desired, a cutoff can also be overridden by a participant.

Accordingly, it may be important for a participant in a market place to find out what price he must make to be a best buyer (seller) in that market. In a single currency marketplace, a buyer (seller) must simply beat the current highest buyer's (or lowest seller's) price. As shown above, in a multi currency marketplace, there is not a clear cut best bid (offer). Instead, there is a currency dependent best bid (offer).

However, the present invention can show a market participant a list of bid levels in his own currency wherein each bid level will beat a given subset of other buyers based on the currency being shown. In a single currency marketplace, a list of bids 101-103 and offers is often available. This list is commonly referred as 'the book'. Embodiments of the present invention allow the book in a multi-currency marketplace to also contain information as to which is the best bid and best offer for each viewing currency, enabling a market maker to better understand what price the market maker must make to effectively be the best bid.

Some embodiments can also include a mechanism wherein a market participant can declare that the participant wants to be the best bid (offer). The MCM 107 will use the currency of a current best offer (bid), wherein the best bid (offer) can be selected as described above. If another offer (bid) becomes the best offer (bid) or if, because of currency effects a new seller (buyer) would trade with a different bid (offer), the participant with the original best bid (offer) would be notified before the alternative trade would be allowed to occur. The participant with the original best bid (offer) is given priority to transact at that level. Embodiments can also provide the priority for a limited time only and then let the market proceed at will.

Figure 2:
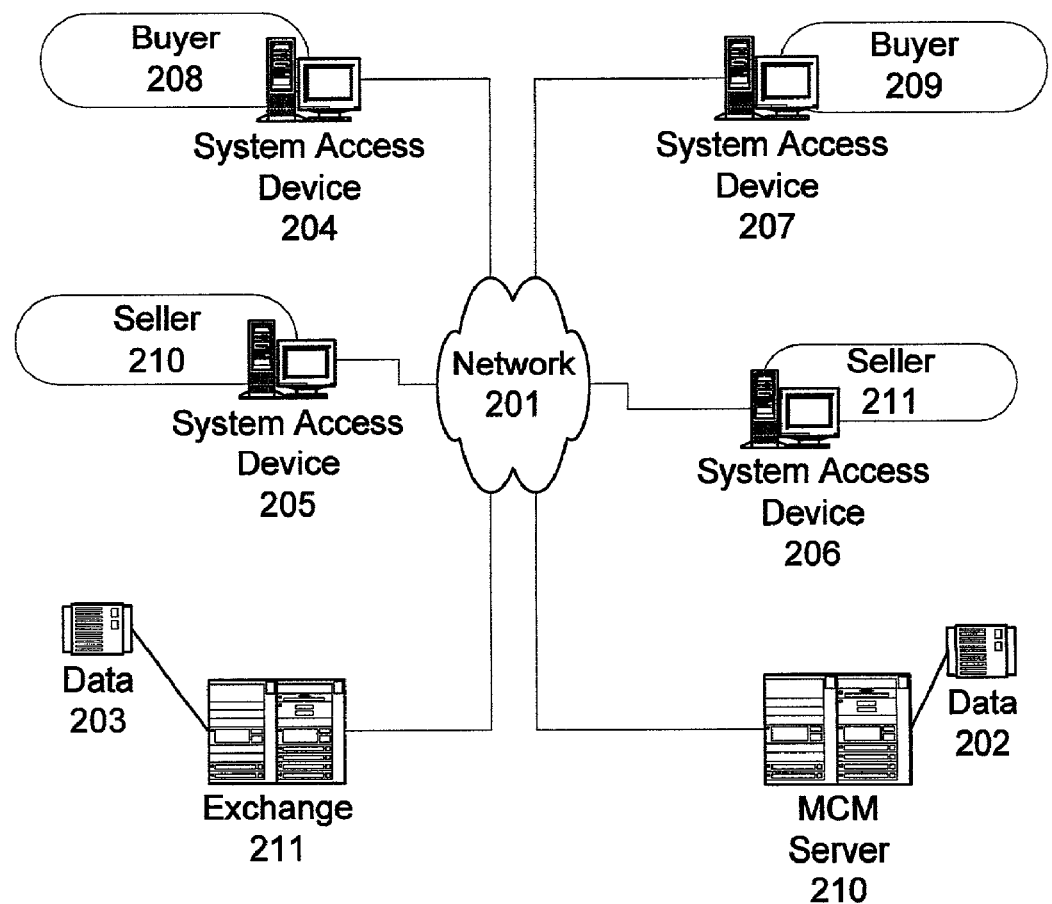
FIG. 2 illustrates a network of computer systems that can embody a MCM system.

Referring now to FIG. 2, a network diagram illustrating one embodiment of the present invention is shown 200. An automated MCM 107 can include a computerized MCM server 210 accessible via a distributed network 201 such as the Internet, or a private network. A participant 208-211 can use a computerized system or network access device 204-207 to receive, input, transmit or view information processed in the MCM server 210. A protocol, such as the transmission control protocol internet protocol (TCP/IP) can be utilized to provide consistency and reliability.

In addition, an exchange server 211 can also communicate with the MCM server 210 via the network 201 or via a direct link, such as a T1 line, digital subscriber line (DSL), or other high speed pipe. The exchange server 211 can be accessed by a participant 208-211 via a system access device 204-207 and a communications network 201, such as a local area network, or other private network, or even the Internet, if desired. The Exchange Server 211 can transmit to the MCM server 210 market information, transaction information, information related to currency exchange, or other information that can be useful to the MCM server 210 to determine a best price.

A system access device 204-207 used to access the MCM server 210 can include a processor, memory and a user input device, such as a keyboard and/or mouse, and a user output device, such as a display screen and/or printer. The system access devices 204-207 can communicate with the MCM server 210 to access data and programs stored at the MCM server 210. A system access device 204-207 may interact with the MCM server 210 as if the MCM server 210 were a single entity in the system 200. However, the MCM server 210 may include multiple processing and database sub-systems, such as cooperative or redundant processing and/or database servers that can be geographically dispersed throughout the system 200.

The MCM server 210 can include one or more databases 202 storing data relating to a multi-currency marketplace, and in particular to determining a best price 109, including, for example, exchange rates, bids, offers, or other information. The MCM server 210 may interact with and/or gather data from an operator of a system access device 204-207 or other information source.

Typically a user 208-211 will access the MCM server 210 using client software executed at a system access device 204-207. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the MCM server 210 to the system access device 204-207 and executed at the system access device 204-207 as part of MCM risk management software. Other implementations include proprietary software installed from a computer readable medium, such as a CD ROM. The invention may therefore be implemented in digital electronic circuitry, computer hardware, firmware, software, or in combinations of the above.

Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 8:
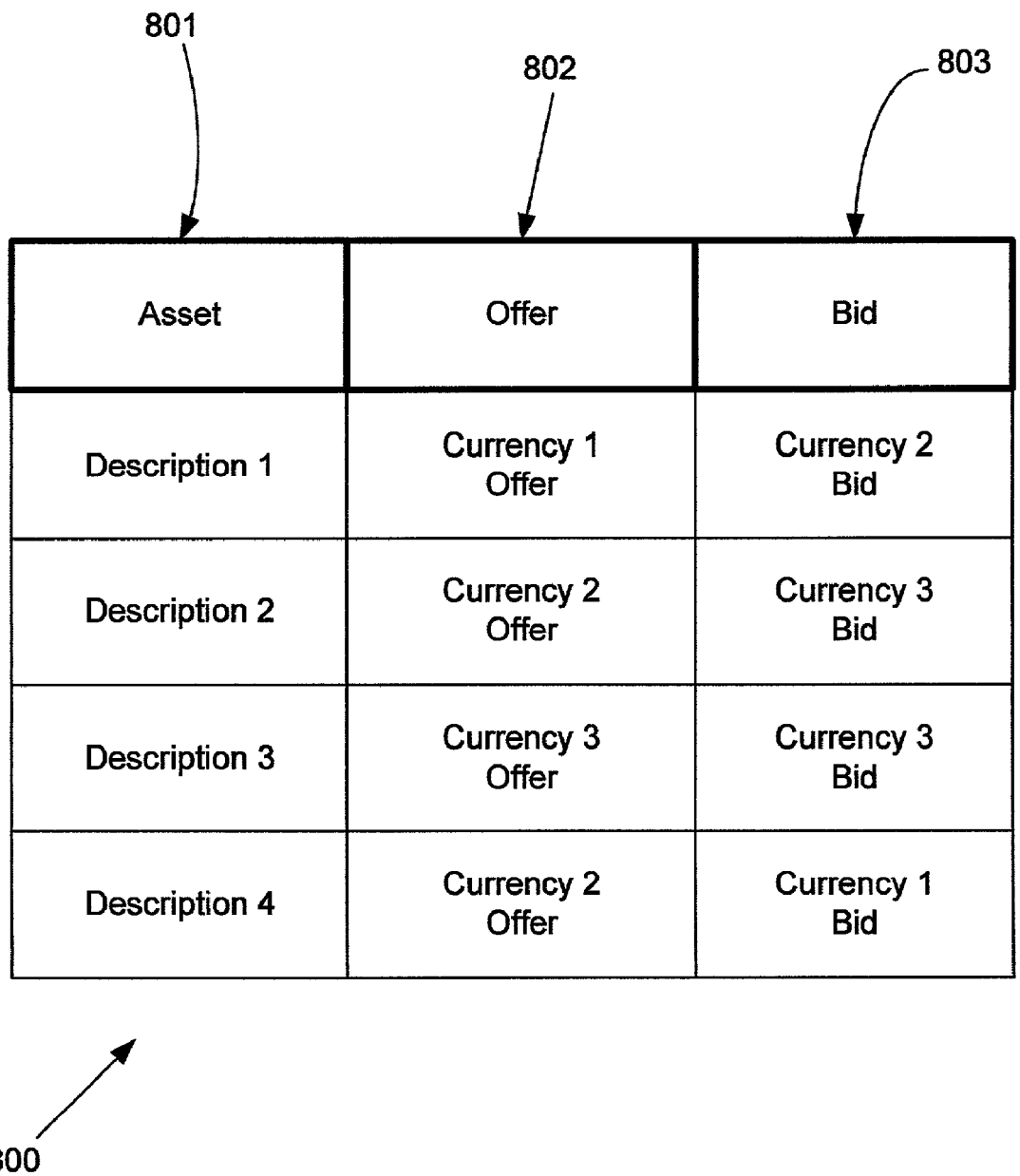
FIG. 8 illustrates an exemplary data structure that can be utilized to implement certain aspects of the present invention.
Figure 9:
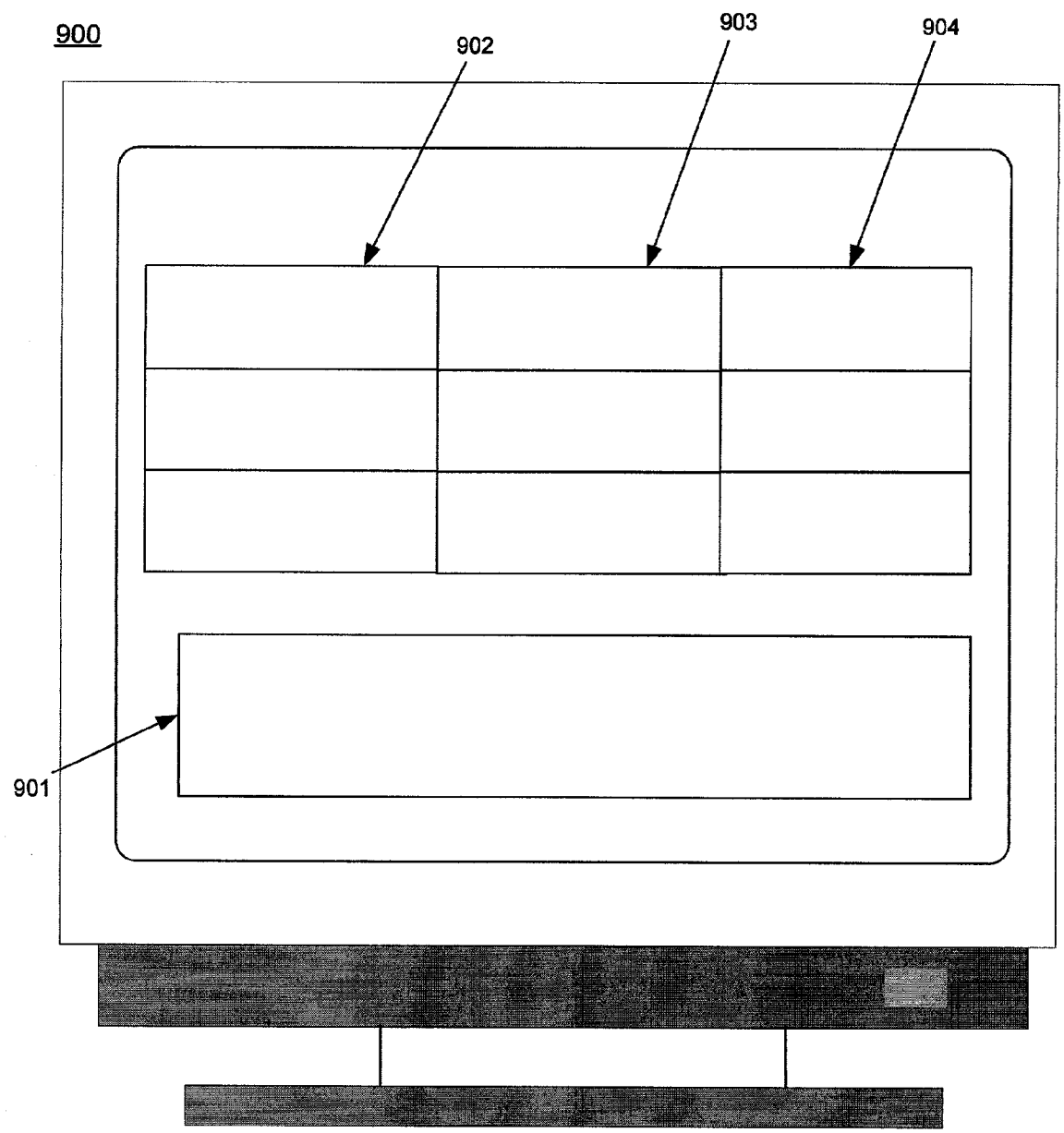
FIG. 9 illustrates an exemplary graphical user interface that can implement various aspects of the present invention.

Referring now to FIG. 8, an example of a data structure that can be utilized while practicing the present invention. The data structure 800 can include a data field for an asset description 801; a data field for an offer 802 which includes a currency and an offer amount; and a data field for a bid 803 which includes a currency and a bid amount. Other data fields and relationships can also be utilized with the current invention according to specific needs of a user. Embodiments can include designation of a default currency that will be utilized unless otherwise instructed. A default currency can include multiple embodiments, such as, for example: a currency default for a user, a default for a MCM 107, a default during one session, a default until otherwise instructed, or other situation Referring now to FIG. 9, an exemplary GUI 900 that can be utilized while practicing the present invention is illustrated. A portion of a display 900 can display information that relates to an exchange or marketplace 901, such as an electronic securities exchange or a B2B exchange. Another portion of the display can include a description of a currency 902 and a bid 803. Still another portion can contain offer information 904.

A number of embodiments of the present invention have been described. Nevertheless, it will be understood that various modifications may be made without departing from the spirit and scope of the invention. Accordingly, other embodiments are within the scope of the following claims.

What is claimed is:

1. A computerized method for buying, the method for selecting a bid price comprising:

determining, by a computer, a currency associated with each individual bid price included in a set of submitted bid prices for an asset electronically traded in a multi-currency environment;

converting, by the computer, the individual bid prices in the set of submitted bid prices into different bid price currencies using an algorithm;

receiving, by the computer, an indication of a currency selected by a seller of the asset, the currency selected by the seller of the asset having respective currency exchange fees associated to each of the different bid price currencies;

ranking, by the computer, the individual bid prices in the set of submitted bid prices in order of a pecuniary value from a perspective of the currency selected by the seller, wherein the bid prices are ranked using a sorting algorithm;

displaying/outputting, by the computer, the ranked individual bid prices in the set of submitted bid prices in order of the pecuniary value from the perspective of the currency selected by the seller;

determining, by the computer, an individual bid price that is a best bid price representing a maximum pecuniary value from the perspective of the currency selected by the seller of the asset;

selecting, by the computer, the individual bid price, included in the set of submitted bid prices, which represents the maximum pecuniary value from the perspective of the currency selected by the seller of the asset; and determining, by the computer, a threshold delta for currency exchange fees that excludes from active consideration the currency selected by the seller if the currency exchange fees for the currency selected by the seller exceeds the threshold delta, wherein the threshold delta represents a maximum tolerance for currency exchange fees.

2. The method of claim 1 wherein the ranked bid prices are denominated in the currency selected by the seller, wherein the bidder submitted the individual bid price.

3. The method of claim 2 further comprising displaying the ranked bid prices to the seller, wherein the seller submitted the individual bid price.

4. The method of claim 1, further comprising incorporating a currency exchange fee, adding the currency exchange fee to the bid price, in which an exchange fee represents a fee for converting the bid price from currency in which the bid price is denominated into the currency selected by the seller.

5. A computerized method for selling, the method for selecting an offer price comprising:
determining, by a computer, a currency associated with each individual offer price included in a set of submitted offer prices for an asset electronically traded in a multi-currency environment;
converting, by the computer, the individual offer prices in the set of submitted offer prices into different offer price currencies using an algorithm;
receiving, by the computer, an indication of a currency selected by a bidder for the asset, the currency selected by the bidder of the asset having respective currency exchange fees associated to each of the offer price currencies;
ranking, by the computer, the individual offer prices in the set of submitted offer prices in order of a pecuniary value from a perspective of the currency selected by the bidder for the asset, wherein the individual offer prices are ranked using a sorting algorithm;
displaying/outputting, by the computer, the ranked individual offer prices in the set of submitted offer prices in order of the pecuniary value from the perspective of the currency selected by the bidder for the asset;
determining, by the computer, an individual offer price that is a best offer price representing a maximum pecuniary value from the perspective of the currency selected by the bidder for the asset;
selecting, by the computer, the individual offer price included in the set of submitted offer prices which represents a maximum pecuniary value from the perspective of the currency selected by the bidder for the asset; and
determining, by the computer, a threshold delta for currency exchange fees that excludes from active consideration the currency selected by the bidder if the currency exchange fees for the currency selected by the bidder exceeds the threshold delta, wherein the threshold delta represents a maximum tolerance for currency exchange fees.

6. The method of claim 5 further comprising incorporating a currency exchange fee, adding the currency exchange fee to the bid price, in which an exchange fee represents a fee for converting individual offer prices from currencies in which the individual offer price is submitted into the currency in which the bidder placed the individual offer price.

7. A computerized system for buying, the computerized system for selecting an individual bid price, the computerized system comprising:
memory;
a processor coupled to the memory, wherein the processor is configured to:
determine a currency associated with each individual bid price included in a set of submitted bid prices for an asset electronically traded in a multicurrency environment;
calculate a quantity, in terms of the currency selected by the seller, for individual bids in the plurality of bids;
convert the individual bid prices in the set of submitted bid prices into different bid price currencies using an algorithm;
receive an indication of a currency selected by a seller of the asset, the currency selected by the seller of the asset having respective currency exchange fees associated to each of the different bid price currencies;
rank the individual bid prices in the set of submitted bid prices in order of a pecuniary value from a perspective of the currency selected by the seller, wherein the individual bid prices are ranked using a sorting algorithm;
display/output the ranked individual bid prices in the set of submitted bid prices in order of the pecuniary value from the perspective of the currency selected by the seller;
determine an individual bid price that is a best bid price representing a maximum pecuniary value from the perspective of the currency selected by the seller of the asset;
select the individual bid price, included in the set of submitted bid prices, which represents the maximum pecuniary value from the perspective of the currency selected by the seller of the asset; and
determine a threshold delta for currency exchange fees that excludes from active consideration the currency selected by the seller if the currency exchange fees for the currency selected by the seller exceeds the threshold delta, wherein the threshold delta represents a maximum tolerance for currency exchange fees.

8. The system according to claim 7 wherein the quantity is calculated according to a formula $PO(i)=BB(i)/S(C(p),C(i))/[1-F(C(p),C(i))]$ for individual currency $C(i)$ in which $C(p)$ is a bidder's currency, $C(i)$ comprises each currency that is displayed in a subset and $BB(i)$ comprises a best bid which is a bid corresponding with a largest calculated value from a perspective of the currency selected by the seller.

9. The system according to claim 7 wherein the system denominates ranked individual bid prices, ranked from perspective of the currency selected by the seller, in the currency in which a bidder placed the bid price, wherein the bidder submitted the individual bid price.

10. The system according to claim 7 wherein the system denominates ranked individual bid prices, ranked from perspective of the currency in which the bid price was place, in the currency in which the bid price was placed.

11. A computerized system for selling, the computerized system for selecting an offer price, the computerized system comprising:
memory;
a processor coupled to the memory, wherein the processor is configured to:
determine a currency associated with each individual bid price included in a set of submitted offer prices for an asset electronically traded in a multicurrency environment;
calculate a quantity, in terms of the currency selected by the seller, for individual bids in the plurality of bids;
convert the individual offer prices in the set of submitted offer prices into different offer price currencies using an algorithm;

receive an indication of a currency selected by a bidder for the asset, the currency selected by the bidder of the asset having respective currency exchange fees associated to each of the offer price currencies;

rank the individual offer prices in the set of submitted offer prices in order of a pecuniary value from a perspective of the currency selected by the bidder for the asset, wherein the individual offer prices are ranked using a sorting algorithm;

display/output the ranked individual offer prices in the set of submitted offer prices in order of the pecuniary value from the perspective of the currency selected by the bidder for the asset;

determine an individual offer price that is a best offer price representing a maximum pecuniary value from the perspective of the currency selected by the bidder for the asset;

select the individual offer price included in the set of submitted offer prices which represents a maximum pecuniary value from the perspective of the currency selected by the bidder for the asset; and determine a threshold delta for currency exchange fees that excludes from active consideration the currency selected by the bidder if the currency exchange fees for the currency selected by the bidder exceeds the threshold delta, wherein the threshold delta represents a maximum tolerance for currency exchange fees.

12. The system according to claim 11 wherein the quantity is calculated according to a formula $PO(i)=BB(i)/S(C(p),C(i))/[1-F(C(p),C(i))]$ for individual currency $C(i)$ in which $C(p)$ is a bidder's currency, $C(i)$ comprises each currency that is displayed in a subset and $BB(i)$ comprises the best offer price, which is an offer price corresponding with a largest calculated value from the perspective of the currency in which the individual offer price was placed.

13. The system according to claim 11 wherein the system denominates ranked plurality of offer prices, ranked from perspective of the currency in which the offer price was place, in the currency in which the offer price was placed.

14. Computer-readable media for buying, comprising computer-executable instructions that, when executed by a computing system, direct a computing system to:

determine a currency associated with each individual bid price included in a set of submitted bid prices for an asset electronically traded in a multicurrency environment;

convert the individual bid prices in the set of submitted bid prices into different bid price currencies using an algorithm;

receive an indication of a currency selected by a seller of the asset, the currency selected by the seller of the asset having respective currency exchange fees associated to each of the different bid price currencies;

rank the individual bid prices in the set of submitted bid prices in order of a pecuniary value from a perspective of the currency selected by the seller, wherein the individual bid prices are ranked using a sorting algorithm;

display/output the ranked individual bid prices in the set of submitted bid prices in order of the pecuniary value from the perspective of the currency selected by the seller;

determine an individual bid price that is a best bid price representing a maximum pecuniary value from the perspective of the currency selected by the seller of the asset;

select the individual bid price included in the set of submitted bid prices which represents the maximum pecuniary value from the perspective of the currency selected by the seller of the asset; and determine a threshold delta for currency exchange fees that excludes from active consideration of the currency selected by the seller if the currency exchange fees for the currency selected by the seller exceeds the threshold delta, wherein the threshold delta represents a maximum tolerance for currency exchange fees.

15. The computer readable media as described in claim 14 wherein the ranked bid prices are denominated in the currency selected by the seller, wherein the bidder submitted the individual bid price.

16. Computer-readable media for selling comprising computer-executable instructions that, when executed by a computing system, direct a computing system to:

determine a currency associated with each individual offer price included in a set of submitted offer prices for an asset electronically traded in a multicurrency environment;

convert the individual offer prices in the set of submitted offer prices into different offer price currencies using an algorithm;

receive an indication of a currency selected by a bidder for the asset, the currency selected by the bidder of the asset having respective currency exchange fees associated to each of the offer price currencies;

rank the individual offer prices in the set of submitted offer prices in order of a pecuniary value from a perspective of the currency selected by the bidder for the asset, wherein the individual offer prices are ranked using a sorting algorithm;

display/output the ranked individual offer prices in the set of submitted offer prices in order of the pecuniary value from the perspective of the currency selected by the bidder for the asset;

determine an individual offer price that is a best offer price representing a maximum pecuniary value from the perspective of the currency selected by the bidder for the asset;

select the individual offer price included in the set of submitted offer prices which represents a maximum pecuniary value from the perspective of the currency selected by the bidder for the asset; and determine a threshold delta for currency exchange fees that excludes from active consideration the currency selected by the bidder if the currency exchange fees for the currency selected by the bidder exceeds the threshold delta, wherein the threshold delta represents a maximum tolerance for currency exchange fees.

17. The computer readable media as described in claim 16 wherein the ranked offer prices are denominated in the currency selected by a bidder, wherein the bidder submitted the individual offer price.

* * * * *